United States Patent Office 3,426,131
Patented Feb. 4, 1969

3,426,131
MEDICAMENT BASED ON A SALT OF
PYRIDOXAMINE
Marcel Perrault, Paris, France, assignor to Laboratoires Laroche Navarron, Levallois-Perret, France, a French company
No Drawing. Filed May 16, 1966, Ser. No. 550,098
Claims priority, application France, May 19, 1965, 17,572
U.S. Cl. 424—263     3 Claims
Int. Cl. C07d 31/36; A61kl 27/00

ABSTRACT OF THE DISCLOSURE

Pyridoxamine is reacted with a higher unsaturated fatty acid such as arachidonic acid, linoleic acid and linolenic acid, in proportions such as to form the mono-acid addition salt. These salts or mixtures thereof exhibit interesting pharmacological properties and may be administered internally or externally in a suitable vehicle for the prevention or treatment of skin disorders.

---

The present invention relates to a medicament for the treatment of cutaneous disorders. More particularly it relates to a novel medicament based on a salt of pyridoxamine.

Pyridoxamine, a substance endowed with vitamin $B_6$ properties, is methyl-2 hydroxy-3 aminomethyl-4, hydroxymethyl-5, pyridine corresponding to the formula

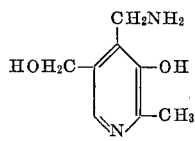

It has been discovered that vitamin F type fatty acid salts of pyridoxamine are unexpectedly superior in effectiveness for the prevention or treatment of skin disorders.

As regards substances possessing vitamin F properties, they include linoleic acid

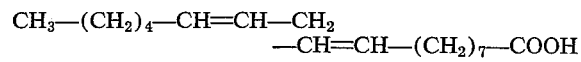

linolenic acid

and arachidonic or eicosa Δ-5,8,11,14 tetra-enoic acid.

According to the present invention there is provided a medicament comprising as an essential active ingredient at least one compound of the class consisting of vitamin F type unsaturated fatty acid salts of pyridoxamine.

According to another aspect of the invention there is provided a process for the preparation of said medicament. Said compound may be a compound of the class consisting of pyridoxamine mono-lineate, mono-linolenate and mono-arachidonate.

The novel medicament may comprise as a preferred embodiment the addition product, molecule to molecule of pyridoxamine and oleic, linoleic and linolenic acids mixed in the ratio of 15±8%, 22±2% and 63±6%.

This mixture of salts may be prepared by the reaction of pyridoxamine and the mixture of acids at a temperature above 100° in order that all traces of moisture may be eliminated at the same time. Clearly a lower temperature may be employed at a reduced pressure.

In order that the invention may be more readily understood, the preparation and biological testing of one embodiment thereof, purely by way of illustrative and non-limiting example, is described below.

4.788 g. of pyridoxamine base is added progressively to 10 g. of the above-mentioned mixture of acids, at a temperature slightly above 100°, until the solution obtained is quite clear, after which it is cooled. The liquid solidifies to a waxy mass, greasy to the touch. This product is soluble in 95° alcohol, in methanol and in chloroform; it is insoluble in petroleum ether and in ethyl acetate.

The novel product has been submitted to the physiological tests described below.

(1) Effect on the growth of the young rat: 60 female rats of 40 to 50 g. divided into 4 groups of 15 animals, were subjected for 21 days to a diet deficient in unsaturated fatty acids and in vitamin $B_6$.

From the 22nd day and for 6 weeks:

Group 1 (control group) was maintained on the same diet;

Group 2 received a daily supplement of 23.7 mg./100 g. of the above-mentioned mixture of acids;

Group 3 received a daily supplement of 12.5 mg./100 g. of vitamin $B_6$;

Group 4 received a daily supplement of 36.2 mg./100 g. of the new product.

The weight curve was drawn at the end of the six weeks. It shows:

That the control group were retarded in growth relative to the three other groups;

That the latter had a distinctly improved growth, especially those of Group 4.

In the controls, there was observed, during the test, the characteristic syndromes of vitamin deficiency: teething troubles, frayed tail, loss of fragments of tail.

In none of the Groups 2 to 4, was any aggravation of tail lesions noted. Quite to the contrary, all the lesions were arrested and, particularly in the groups treated with the new compound, they progressed towards very definite healing.

In a parallel manner, teething troubles disappeared.

(2) Effect on experimental eczema induced in the guinea-pig by applications of para-phenylene-diamine.

The test was carried out following the procedure published by Ch. Grupper (VIIème congrès des dermatologistes et syphiligraphes de langue française—Bruxelles Liege—April 21–23 1949).

(A) During a preparatory period of 20 days, 60 albino guinea-pigs of 250 to 300 g., divided into 4 groups of 15 animals, received a diet deficient in unsaturated fatty acids and in vitamin $B_6$.

Group 1 served as the control group;

Group 2 received a daily supplement per guinea-pig of 50 mg. of the above-mentioned mixture of acids;

Group 3 received a daily supplement per guinea-pig of 24 mg. of vitamin $B_6$;

Group 4 received a daily supplement per guinea-pig of 74 mg. of the new product.

(B) At the end of this twenty days, for 15 days, there was applied, by prolonged massage into the shaved side of the animal, 1 g. of a 10% para-phenylene-diamine ointment.

The members of the control group showed after 3 days a clinical dermatitis, characterised by a distinct thickening of the skin (scaly and shiny appearance) with exudation.

In the treated animals:

Those of Group 2 showed an appreciably less severe and slower appearing dermatitis;

Those of Group 3 showed skin lesions;

Those of Group 4 showed an appreciably normal skin. Only a slight scaly condition was observed.

The novel medicament may be utilised, in human medicine, especially for preventive and curative treatments of cutaneous disorders, particularly eczema, as well as atherosclerosis and thromboses.

The novel medicament may be prepared in any form convenient for oral administration, particularly in tablets, associated with a known excipient suitable for this form, or in capsules, in particular in capsules containing 6 mg., or also in the form of an ointment containing for example 5% or 10% of this product, in a known pharmaceutical vehicle.

It will be understood that various modifications in the product and/or process may be made by those skilled in the art without departing from the scope of the invention as defined in the appended claims.

I claim:

1. A medicament in unit dosage form for oral administration for the treatment of cutaneous disorders, comprising as the principal active ingredient an amount of about 6 mg. of a mixture of pyridoxamine mono-linoleate, pyridoxamine mono-linolenate and pyridoxamine mono-arachidonate in the ratio, of 15±8%, 22±2% and 63±6% respectively, in a pharmaceutically acceptable base.

2. A method of preparing the active ingredient of claim 1 comprising reacting a mixture of acids consisting essentially of 15±8% oleic acid, 22±2% linoleic acid and 63±6% linolenic acid with the molecular equivalent of pyridoxamine at a temperature above 100° C., cooling the reaction products and recovering the mixture of pyridoxamine mono-oleate, mono-linoleate and mono-linolenate.

3. A medicament for the treatment of cutaneous disorders, comprising as the principal active ingredient a mixture of pyridoxamine mono-linoleate, pyridoxamine mono-linolenate and pyridoxamine mono-arachidonate in the ratio of 15±8%, 22±2% and 63±6% respectively, in an ointment, the said active ingredient being present in an amount of about 5% to about 10% of the said ointment.

References Cited

UNITED STATES PATENTS 2,955,115  10/1960  Kummerow et al. _____ 260—295

OTHER REFERENCES

Wagner et al., Vitamins and Coenzymes, published by Interscience Publishers, New York, 1964, p. 389. Copy in Group 124.

RICHARD L. HUFF, Primary Examiner.

U.S. Cl. X.R.

260—279.5